United States Patent [19]

Cooper

[11] Patent Number: 4,993,181
[45] Date of Patent: Feb. 19, 1991

[54] SEMI-AUTOMATIC FISHING APPARATUS

[76] Inventor: Warren Cooper, 1378 Rich Road, Vinemount, Ontario, Canada, L0R 2G0

[21] Appl. No.: 472,141

[22] Filed: Jan. 30, 1990

[51] Int. Cl.$^5$ ............................................. A01K 97/12
[52] U.S. Cl. ....................................................... 43/15
[58] Field of Search ...................................... 43/15, 16

[56] References Cited

U.S. PATENT DOCUMENTS

| | | |
|---|---|---|
| 2,766,543 | 10/1956 | Beck . |
| 2,799,111 | 7/1957 | Voboril . |
| 2,810,981 | 10/1957 | Littau . |
| 2,851,812 | 9/1958 | Beck . |
| 2,984,039 | 5/1961 | Willey . |
| 3,238,658 | 3/1966 | Hall . |
| 3,724,115 | 4/1973 | Derie . |
| 4,193,220 | 3/1980 | Bourquin et al. ........................ 43/15 |
| 4,354,324 | 10/1982 | Eblen . |

Primary Examiner—Richard K. Seidel
Assistant Examiner—Patty E. Hong
Attorney, Agent, or Firm—Patrick J. Hofbauer

[57] ABSTRACT

There is described a semi-automatic fishing apparatus for retaining a baited fishing rod in an inclined, flexed configuration wherein it may be automatically released to an unflexed position in response to tensioning of the fishing line, as for example, by acceptance of the bait by a fish, so as to set the hook in the fish. The apparatus features an elongated inclined base member to which the fishing rod handle is secured at an acute angle to one end and to which the tip of the fishing rod is retained at the opposite other end below the plane of the base member in the flexed configuration through the agency of a latching device. The latching device is tripped directly by the downward movement of the line which line simply overlies the tripping mechanism without the need for complicated threading of the line through the tripping mechanism as in prior art devices. The simplicity of this arrangement facilitates setting the apparatus under arctic conditions where the hands of the operator may remain gloved during the setting operation.

7 Claims, 2 Drawing Sheets

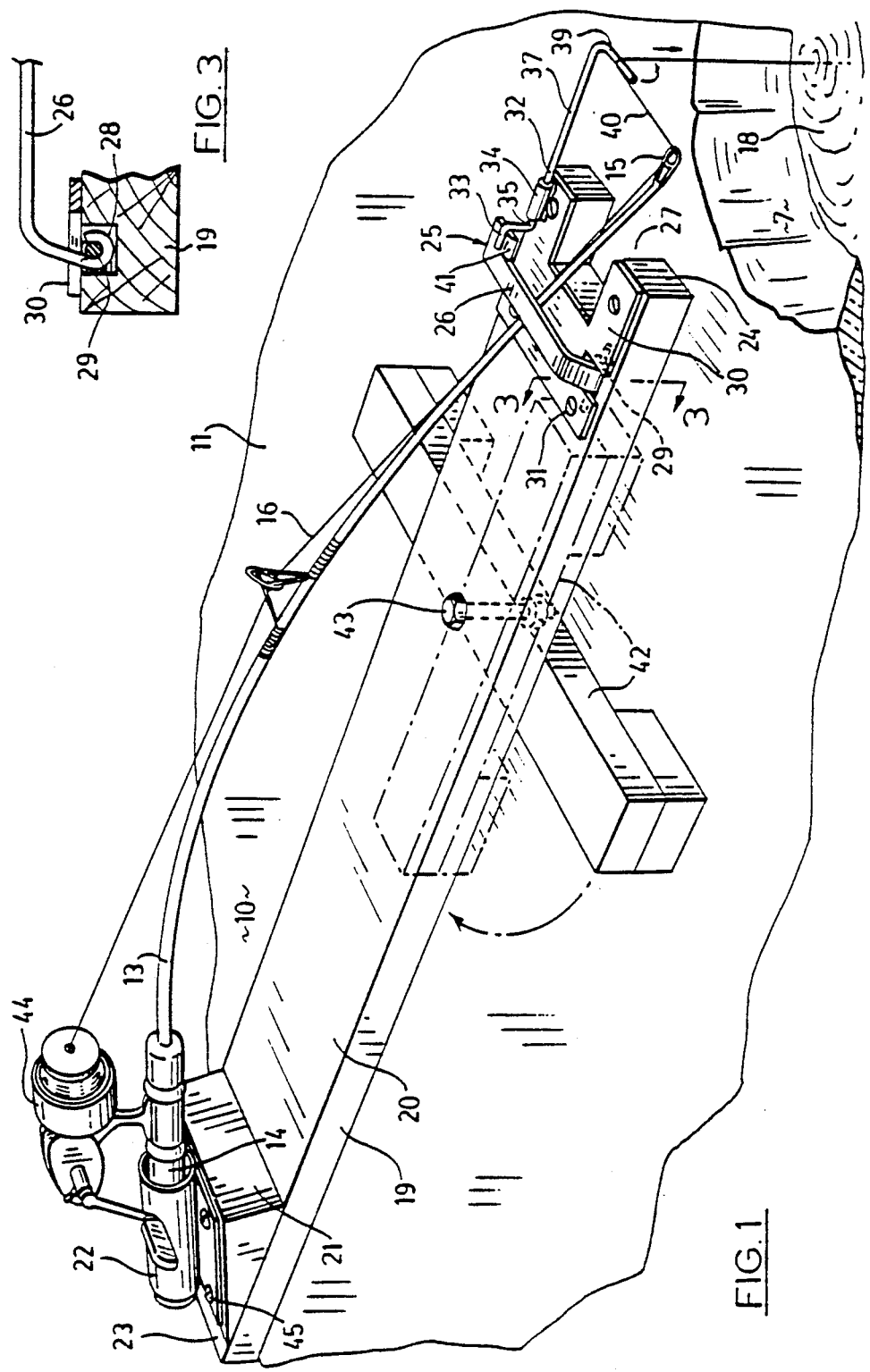

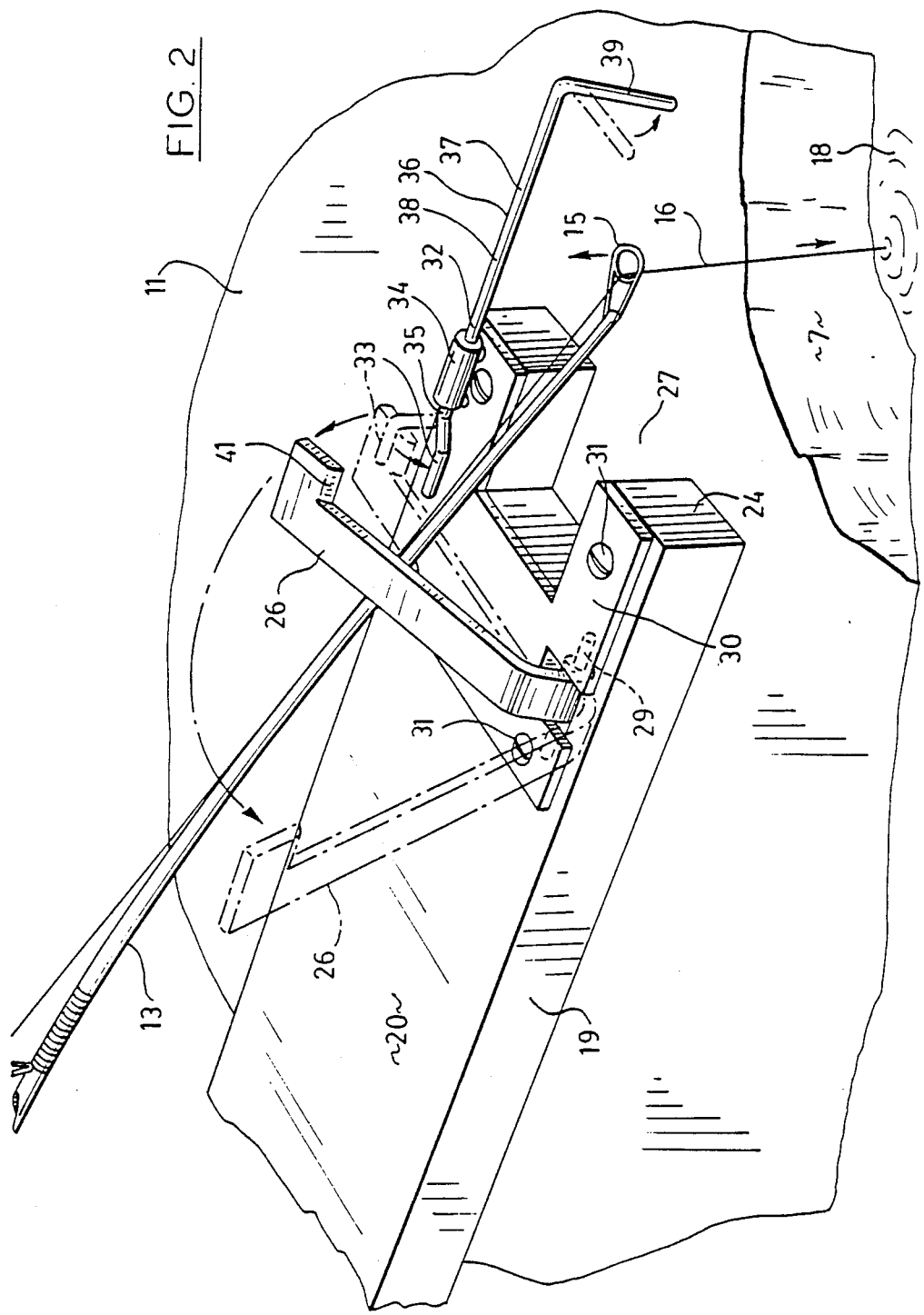

— 1 —

SEMI-AUTOMATIC FISHING APPARATUS

The present invention relates to an apparatus for watching fish and more particularly to an apparatus for supporting a baited fishing rod in an inclined flexed configuration for automatic release to an unflexed configuration in response to a fish accepting the bait, so as to set the fish hook in the mouth of the fish.

The advantages of semi-automatic fishing devices are generally well-known and are discussed, for example, in the following Patents, which are representative of the prior art:

U.S. Pat. No. 2,766,543 issued Oct. 16, 1956 (Beck);
U.S. Pat. No. 2,799,111 issued July 16, 1957 (Voboril);
U.S. Pat. No. 2,810,981 issued Oct. 29, 1957 (Littau);
U.S. Pat. No. 2,851,812 issued Sept. 16, 1958 (Beck);
U.S. Pat. No. 2,984,039 issued May 16, 1961 (Willey);
U.S. Pat. No. 3,238,658 issued Mar. 8, 1966 (Hall); and,
U.S. Pat. No. 4,354,324 issued Oct. 19, 1982 (Eblen).

The term "semi-automatic" is used above and in the remainder of this specification to mean a fishing device which, once set by the operator, is triggered by tension introduced from a fishing line into a fishing rod associated with the device so as to set a fishhook in the mouth of a fish without the further need for intervention by the operator. That is, the device is not "fully-automatic", as it must be manually set by the operator.

There are numerous disadvantages associated with known semi-automatic fishing devices. Significant among these is the complexity of design of the known devices, which complexity not only contributes to their cost, but significantly increases the difficulty associated with their use. More specifically, nearly all of the known semi-automatic fishing devices rely for their proper operation upon threading by hand of the fishing line through the tripping mechanism. This is not only tedious and time consuming, but requires considerable dexterity on the part of the user. In colder climatic applications sufficient dexterity may not be obtainable without removal of handwear, which is undesirable.

In the present invention the tripping mechanism is simply set by the falling of the fishing line over a trip rod as a natural consequence of latching the latch mechanism. In this manner, it is not necessary for the operator to thread the fishing line through eyelets, hooks or other line retaining devices. Indeed, the operator need not actually handle the fishing line to set the apparatus, so that a much lower degree of dexterity is required than with prior art devices. This makes the present invention especially suitable for use in colder climates, in, for example, ice-fishing, as removal of handwear by the user is not required for use.

One prior art device which does not require threading of the fishing line through the tripping mechanism is shown in U.S. Pat. No. 3,724,115, issued Apr. 3, 1973 to Derie. The present invention advantageously differs from the teachings of this patent and the other patents listed above by exhibiting superior stability by reason of, for example, a low (i.e. relatively horizontal) operative orientation for the fishing rod, and by the provision of lateral stabilizing structures on the base member, all of which reduce the incidence of lateral tipping which is a common problem in the prior art. Moreover, the tripping mechanism of the present invention is more sensitive and reliable than that of the Derie device.

It is an object of the present invention to provide an improved semi-automatic fishing apparatus in which these and other shortcomings of the prior art are overcome. This is achieved by providing, in a device for use with a fishing rod having a handle at one end, a tip at the opposite other end and a line extending from the handle beyond the tip, an elongated generally planar base member adapted on its upper surface adjacent its first end for mounting of the handle so as to hold the rod in an unflexed configuration at an angle acute to the upper surface, with the tip of the unflexed rod overlying the second end of the base member. A latching means is positioned on the base member adjacent its second end and is adapted to be movable under urging from the fishing rod from a latched configuration wherein the rod is held in a flexed configuration with the tip below the upper surface of the base member to an unlatched configuration wherein the rod is released and allowed to return to the unflexed configuration. A tripping means is positioned on the base member adjacent the second end thereof and is adapted to urge the latching means from the latched to the unlatched configuration in response to tensioning of the line. A stabilizing means is connected to the base member intermediate between the first end and the latching means so as to laterally stabilize the base member and so as to upwardly incline the second end relative to the first end.

In order that the invention may be readily understood, one embodiment thereof will be described by way of example, with reference to the accompanying drawings in which:

FIG. 1 is a perspective view of a device according to the invention shown with the associated fishing rod in the flexed configuration.

FIG. 2 is a partial perspective view similar to FIG. 1 with the fishing rod shown intermediate between the flexed and unflexed configurations; and, FIG. 3 is a detail sectional view along line 3—3 of FIG. 1.

FIGS. 1 and 2 show a device 10 according to the invention being used for ice-fishing. The device 10 is used in conjunction with a conventional fishing rod 13 having a handle 14 at one end and a tip 15 at the opposite other end with a line 16 extending from the handle 14 beyond the tip 15. In the particular application shown, the device 10 is set upon an ice surface 11 with the line 16 extending through a hole 7 in the ice surface 11 into the water 18. A conventional fish hook (not shown) is arranged on the end of the fishing line 16 below the surface of the water 18 and is baited in an appropriate manner.

The device 10 is comprised of an elongated generally planar base member 19 adapted on its upper surface 20 adjacent a first end 23 for removable mounting of the handle 14. Such mounting can be by any conventional means, and as shown, comprises a tubular mounting socket 22 rigidly mounted by screws 45 on an inclined mounting block 21, which block 21 is itself rigidly affixed to the base member 20 adjacent the first end 23. The tubular mounting socket 22 is adapted to accept the handle 14 of the fishing rod 13 so as to hold the unflexed rod 13 at an angle acute to the upper surface 20 of the base member 19. When so mounted in the unflexed configuration (not shown) the tip 15 of the unflexed rod 11 will overlie the second end 24 of the base member 19.

A latching means 25 is positioned on the upper surface 20 of the base member adjacent the second end 24 and is adapted to be movable from a latched configuration (see in FIG. 1), wherein the rod is held in a flexed configuration with the tip 15 below the upper surface 20, to an unlatched configuration shown in solid lines in FIG. 2 wherein the rod 13 is released and allowed to return to the unflexed configuration (not shown).

To facilitate the holding of the tip 15 below the upper surface 20, an axially aligned slot 27 is provided in the base member 19 at the second end 24 so as to allow the downward passage therethrough of the fishing rod 11 in the flexed configuration. While it is an essential feature of the present invention to hold the tip 15 below the upper surface 20 in order to increase the stability of the assembly and to enable sufficient "whip" of the fishing rod 13 to properly set the fish hook in the mouth of the fish, the necessity of providing an axially aligned slot 27 will depend upon the length of the rod 13 in relation to the length of the base member 19 and relative to the positioning of the latching means 25. It is, however, preferred to provide such an axially aligned slot 27 so as to be able to accommodate various lengths of fishing rods 13.

The illustrated latching means 25 comprises a retainment member 26 which is adapted to be positioned transversely across the slots 27 in the upward path of the flexed fishing rod 13 so as to retain the rod 13 in the flexed configuration shown in FIG. 1 and which retainment member 26 is adapted to swing clear of the upward path of the fishing rod when released from the latched configuration by the tripping means 36. Such adaptation is accomplished by pivotally mounting the retainment member 26 on the upper surface 20 of the base member 19. As will be more apparent from FIG. 3, the retainment member 26 is pivotally mounted in a recess 28 of the base member 19 by means of a pivot pin 29 and a cover plate 30, which is affixed to the base member 19 by means of mounting screws 31.

The latching means 25 additionally comprises an interference member in the form of a rod or bar 32 which is axially rotatably mounted on the upper surface 20 in substantially transverse orientation to the retainment member 26 by means of a mounting bracket 34 rigidly affixed to the cover plate 30. The interference member 32 has an off-set hook portion 33 positioned at one end 35 so as to be adapted to release the retainment member 26 from the latched configuration under rotational urging by the tripping means 36.

The tripping means 36 comprises an axial extension 37 of the other end 38 of the interference member 32 beyond the second end 24 of the base member 20. This axial extension 37 terminates in a generally transversely bent portion 39 which portion is oriented at approximately right-angles to the hook portion 33 so as to define a plane positioned generally parallel to the upper surface 20 of the base member 19 when the latching means 25 is in the latched configuration as shown in FIG. 1 and as shown in phantom outline in FIG. 2. The bent portion 39 is adapted to move downwardly out of said generally parallel plane upon tensioning of an overlain portion 40 of the fishing line 16 so as to cause rotational urging of the interference member 32 by the axial extension 37. It will be obvious from the drawings that such urging of the interference member 32 causes movement of the hooked portion 33 in an anti-clockwise direction as seen in FIGS. 1 and 2 so as to clear a detent portion 41 of the retainment member 26, thereby allowing consequential movement of the retainment member 26 to the unlatched configuration under urging from the flexed fishing rod.

Stabilizing means are provided in the form of a bi-laterally extending fulcrum 42 which is pivotally connected to the base member 19 by means of a pivot bolt 43 intermediate of the first end 23 and the latching means 25. Such pivotal mounting allows for alignment of the fulcrum 42 with the axis of the base member 19 for ease of transportation and storage, as shown in phantom lines in FIG. 1. The purpose of the fulcrum 42 is two-fold. The provision of such stabilizing means is essential if the problem of lateral tipping associated with the prior art is to be avoided. Moreover, the provision of the fulcrum 42 upwardly inclines the second end 24 relative to the first end 23 so as to allow the tip 15 of the rod 13 to project below the upper surface 20 of the base member 19 while keeping the center of gravity of the device relatively low. Additionally, a longitudinal rocking action of the base member is possible with this arrangement, which rocking motion more accurately simulates the natural hand motion of a fisherman. It has been found to be particularly effective to mount the stabilizing means on the base member 19 approximately two-thirds of the distance between the first end 23 and the latching means 25.

In operation, the handle 14 is simply placed into the mounting socket 22 and the tip 15 of the fishing rod 11 is bent downward by the user so that the rod 13 extends downwardly through the slot 27. While holding the rod 13 in this position, the retainment member 26 is pivoted across the slot and the interference member 32 is rotated so that the hook portion 33 catches the detent portion 41 of the retainment member 26. The flexed fishing rod 13 is then slowly released to contact the underside of the retainment member 26. The fishing line 16 is then overlain the bent portion 39 of the axial extension 37 and the device is fully set. Depending upon the dimensions of the fishing rod 13, the setting action of the retainment member 26 may automatically engage the fishing line 16 with the bent portion 39 without the need for a separate laying of the line 13 across the bent portion 39. In either instance, setting of the device is quick and simple and can be accomplished without the need to remove handwear. It has been found to be most effective if the fishing rod 13 is mounted so that the reel 44 projects sideways generally parallel to the upper surface 20 such that the line 13 does not contact the underside of the retainment member 26. While such contact (as shown in FIG. 3) will not significantly interfere with the operation of the device, it is generally desirable to avoid such contact, especially where the spinning action of the reel 44 is to be transmitted by the line 16 to the hook (not shown).

While but one specific example of the present invention is herein shown and described, it will be understood the various changes in size, shape, selection of materials and arrangement of parts may be made without departing from the spirit of the invention. For example, the base member 19 can be comprised of telescopic sections so that the effective length thereof can be varied. In this manner, a single device will accommodate a wide range of fishing rod lengths Moreover, the mounting socket 22 could be replaced by a wide variety of mounting devices utilizing, for example, clamping devices, set screws, set pins etc. Although the base member 19, fulcrum 42 and mounting block 21 as shown are constructed from wood, with the remainder of the device constructed from various metals, the entire device or portions thereof could be constructed from metal or plastics, or combinations thereof.

I claim:

1. A device for use with a fishing rod having a handle at one end, a tip at the opposite other end and a line extending from the handle beyond the tip, said device comprising:

an elongated generally planar base member adapted on its upper surface adjacent a first end for mounting of the handle so as to hold the rod in an unflexed configuration at an angle acute to the upper surface, with the tip of the unflexed rod overlying the second end of the base member;

latching means positioned on the base member adjacent its second end and adapted to be movable under urging from the fishing rod from a latched configuration wherein the rod is held in a flexed configuration with the tip below the upper surface to an unlatched configuration wherein the rod is released and allowed to return to the unflexed configuration;

tripping means positioned on the base member adjacent its second end and adapted to urge the latching means from the latched to the unlatched configuration in response to tensioning of the line;

stabilizing means connected to the base member intermediate between the first end and the latching means so as to laterally stabilize the base member and so as to upwardly incline said second end relative to said first end; and, an axially aligned slot provided in the base member at the second end so as to allow the downward passage therethrough of the fishing rod in the flexed configuration.

2. A device according to claim 1 wherein the latching means is positioned intermediate of the first end and said slot.

3. A device according to claim 2 wherein the stabilizing means is pivotally connected to the base member intermediate of the first end and the latching means.

4. A device according to claim 3 wherein both the latching means and the tripping means are mounted upon the upper surface of the base member.

5. A device according to claim 4 wherein the latching means comprises a retainment member which is adapted to be positioned in the latched configuration transversely across the slot in the upward path of the flexed fishing rod, so as to retain the rod in said flexed configuration, and which is adapted to swing clear of the upward path of the fishing rod when released from the latched configuration by the tripping means.

6. A device according to claim 5 wherein the latching means additionally comprises an interference member which is axially rotatably mounted on the upper surface in substantially transverse orientation to the retainment member and which interference member has an off-set hook portion positioned at one end so as to be adapted to selectively hold the retainment member in the latched configuration until released from said latched configuration upon rotational urging by the tripping means.

7. A device according to claim 6 the tripping means comprises an axial extension of the other end of the interference bar beyond the second end of the base member, which extension terminates in a generally transversely bent portion which defines a plane generally parallel to the upper surface of the base member when the latching means is in the latched configuration and which portion is adapted to move downwardly out of such plane upon tensioning of an overlain portion of the fishing line so as to cause rotational urging of the interference bar and thereby allowing consequential movement of the retainment member to the unlatched configuration.

* * * * *